United States Patent
Cope

(10) Patent No.: US 9,659,191 B2
(45) Date of Patent: May 23, 2017

(54) ENCRYPTION KEY STORAGE AND MODIFICATION IN A DATA STORAGE DEVICE

(71) Applicant: SEAGATE TECHOLOGY LLC, Cupertino, CA (US)

(72) Inventor: George Christian Cope, Lyons, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 93 days.

(21) Appl. No.: 14/248,678

(22) Filed: Apr. 9, 2014

(65) Prior Publication Data
US 2015/0293857 A1   Oct. 15, 2015

(51) Int. Cl.
*G06F 12/14* (2006.01)
*G06F 21/79* (2013.01)

(52) U.S. Cl.
CPC ...... *G06F 21/79* (2013.01); *G06F 2221/0748* (2013.01); *G06F 2221/2143* (2013.01)

(58) Field of Classification Search
CPC ....... G06F 2212/214; G06F 2212/2142; H04L 9/085; H04L 29/06659
USPC ........................................................ 713/193
See application file for complete search history.

(56) References Cited

U.S. PATENT DOCUMENTS

| | | | |
|---|---|---|---|
| 5,010,331 A * | 4/1991 | Dias | G04F 1/005 340/5.28 |
| 6,850,443 B2 * | 2/2005 | Lofgren et al. | 365/185.29 |
| 7,747,025 B1 * | 6/2010 | Trimberger | 380/284 |
| 8,250,380 B2 | 8/2012 | Guyot et al. | |
| 8,423,789 B1 * | 4/2013 | Poo et al. | 713/189 |
| 8,502,555 B1 * | 8/2013 | Peterson | G11C 7/24 326/105 |
| 8,924,740 B2 * | 12/2014 | Yu | H04L 9/003 380/259 |
| 2005/0114589 A1 * | 5/2005 | Lofgren et al. | 711/103 |
| 2008/0061817 A1 * | 3/2008 | Erickson et al. | 326/8 |
| 2008/0189559 A1 * | 8/2008 | Delfs | G06F 12/1408 713/193 |
| 2009/0217054 A1 * | 8/2009 | Haider et al. | 713/189 |
| 2011/0002186 A1 * | 1/2011 | Buonpane et al. | 365/225.7 |

(Continued)

OTHER PUBLICATIONS

Shastry et al, Rolled Architecture Based Implementation of AES Using T-Box, IEEE, 2012, pp. 626-630.*

(Continued)

*Primary Examiner* — Christopher Brown
*Assistant Examiner* — Jenise Jackson
(74) *Attorney, Agent, or Firm* — Holland & Hart LLP

(57) ABSTRACT

Methods, systems, and devices are described for encryption key storage and modification in a data storage device. A portion of an encryption key may be stored in a first storage medium, and one or more bits of the encryption key may be stored in a one-time writable storage location. Data received at the data storage device may be encrypted using the encryption key, and may be stored in a storage medium. In the event that it is no longer desired to allow users to access the encrypted data stored in the storage medium, the one or more bits of the encryption key stored in a one-time writable storage location may be modified. Such modification thereby prevents decryption of the encrypted data and effectively precludes access to the encrypted data.

11 Claims, 6 Drawing Sheets

(56) References Cited

U.S. PATENT DOCUMENTS

| | | | |
|---|---|---|---|
| 2011/0029815 A1* | 2/2011 | Case | 714/36 |
| 2011/0154060 A1* | 6/2011 | Guyot et al. | 713/193 |
| 2011/0176380 A1* | 7/2011 | Bentley | G11C 16/22 365/225.7 |
| 2012/0069995 A1* | 3/2012 | Matthews, Jr. | G06F 21/78 380/44 |
| 2013/0151842 A1* | 6/2013 | Yu | 713/150 |
| 2014/0122903 A1* | 5/2014 | Endo | G06F 21/602 713/193 |
| 2015/0236856 A1* | 8/2015 | Moore | H04L 9/3247 713/176 |
| 2016/0140057 A1* | 5/2016 | Endo | G06F 21/602 713/193 |

OTHER PUBLICATIONS

Chen et al, Impact of Circuit Degradation of FPGA Design Security, IEEE, 2011, pp. 230-235.*

\* cited by examiner

ENCRYPTION KEY STORAGE AND MODIFICATION IN A DATA STORAGE DEVICE

SUMMARY

The present disclosure provides one or more improved systems, methods, and/or apparatuses for encryption key storage and modification in a data storage device. In some examples, a portion of an encryption key may be stored in a first storage medium, and one or more bits of the encryption key may be stored in a one-time writable storage location. Data received at the data storage device may be encrypted using the encryption key, and may be stored in a storage medium. In the event that it is no longer desired to allow users to access the encrypted data stored in the storage medium, the one or more bits of the encryption key stored in a one-time writable storage location may be modified. Such modification thereby prevents decryption of the encrypted data and effectively precludes access to the encrypted data.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure generally relates to data security and storage of encryption keys used in self encrypting drives (SEDs). In accordance with various embodiments, a storage device is provided which employs an encryption scheme to convert input data (plaintext) into encoded data (ciphertext) prior to storage in a memory location, such as a page of memory in a solid-state drive (SSD), for example. In some aspects of the present disclosure, a portion of an encryption key may be stored, for example, in an electronically erasable programmable read only memory (EEPROM). A remainder of the encryption key may be stored in a one-time writable storage location, such as an electronic fuse (eFuse) array. Data received at the data storage device may be encrypted using the encryption key, and may be stored in a storage medium. In the event that access to the stored data is to be prevented, the one or more bits of the encryption key stored in the one-time writable storage location may be modified. For example, the eFuses containing the remainder of the encryption key may be blown, thereby rendering the portion of the encryption key stored in the one-time writable memory unreadable. Thus, decryption of the encrypted data is prevented and the data stored in the data storage medium rendered unreadable.

Various examples described herein are made in reference to solid state drives, which generally include non-volatile solid-state memory, which may exhibit faster data transfer performance than a traditional hard disk drive (HDD) having rotating magnetic media. As a result, such devices can be used as standalone replacement for an HDD and/or as a cache for an HDD. One difference between, e.g., an SSD and an HDD, is that the memory cells of an SSD have a finite life, measured as a function of number of erase/write cycles applied the memory cells. While an HDD may also exhibit wear (e.g., mechanical wear) that limits life of the device, the magnetic disks that are used as data storage media are not considered to be life-limited based on the number of erase/write cycles applied.

Figure 1:
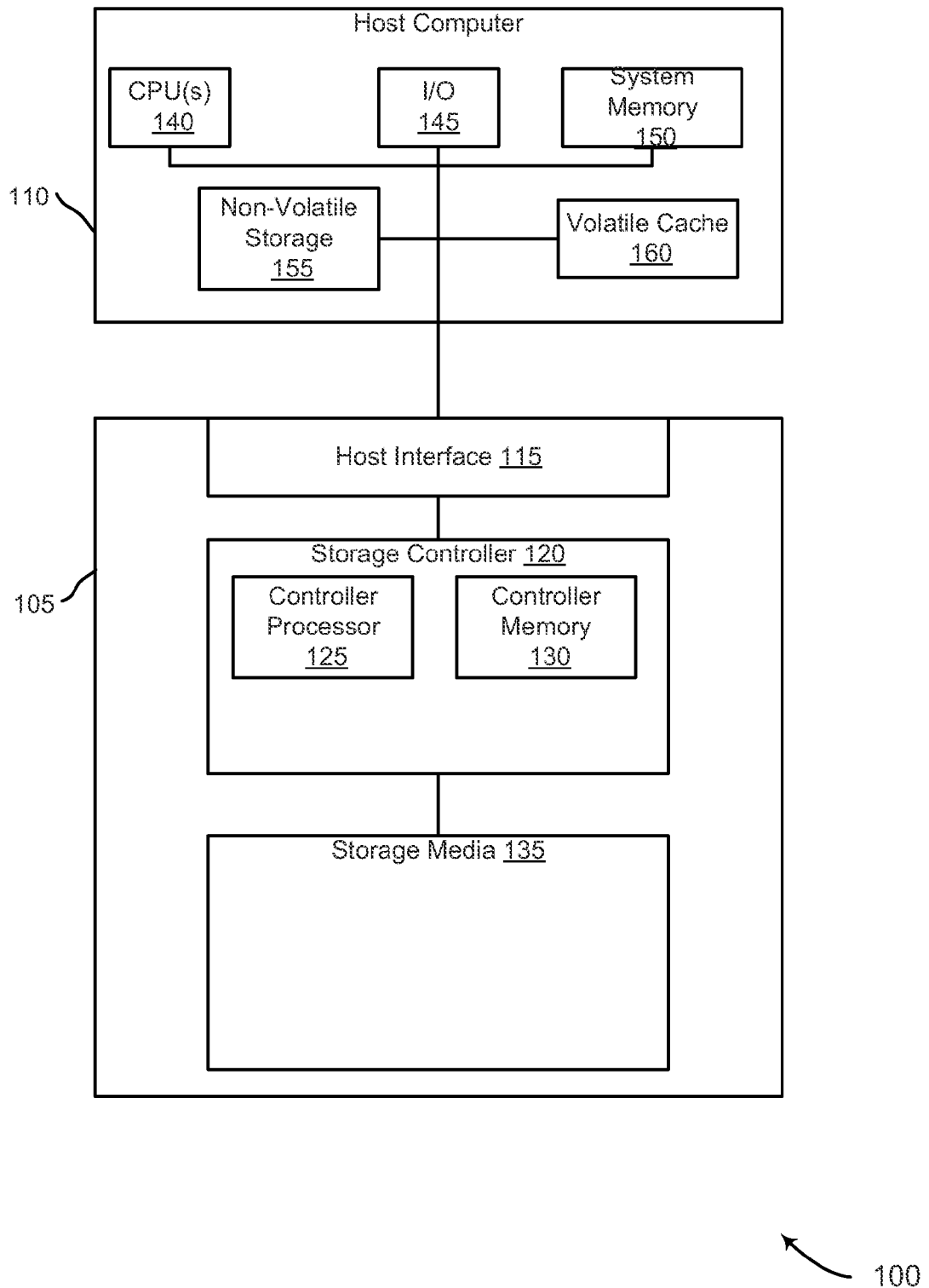
FIG. 1 is a block diagram representation of an example data storage device and host computer configured and operated in accordance with various embodiments.

With reference now to FIG. 1, a block diagram illustrates a system 100 having a non-volatile solid-state memory apparatus 105 (such as an SSD) according to various examples of the present disclosure. The apparatus 105 is configured as an SED, in which data from host computer 110 is received at the apparatus 105, encrypted, and stored. The apparatus 105 may be any type of persistent solid-state storage device, including an SSD, thumb drive, memory card, embedded device storage, etc. The apparatus 100 may include a host interface 115 that facilitates communications between the apparatus 105 and the host computer 110.

The apparatus 105 of this example includes one or more storage controllers 120, which may include a controller processor 120, which may be a general-purpose or special-purpose processors that perform operations of the apparatus 105. The storage controller 120 may include any combination of microprocessors, digital signal processor (DSPs), application specific integrated circuits (ASICs), field programmable gate arrays (FPGAs), or other equivalent integrated or discrete logic circuitry suitable for performing the various functions described, herein. The controller processor 155 may be in communication with a controller memory 125, which may store computer readable code that may be executed by the controller processor 120 to perform various operations of the apparatus 105. In some examples, as will be described in more detail below, the controller memory 125 includes non-volatile memory that may store a portion of an encryption key used, to encrypt data stored in storage media 130. In some examples, the controller processor 120 may also store a portion of the encryption key in a one-time writable storage location located within the controller processor 120, as will be discussed in more detail below.

Functions that may be provided by the controller storage controller 120 include, for example, functions related to storage and retrieval of data to/from the storage media 130. Such functions may include, for example, address translation/mapping, caching, wear-leveling operations, and encryption/decryption operations. Such functions may be implemented using any combination of hardware, software, and/or firmware. As mentioned above, storage controller 120 includes controller memory 125, which may include non-volatile memory, and which may also include volatile random access memory (RAM). The RAM may be used, among other things, to cache data read from or written to storage media 130, map logical to physical addresses, and store other operational data used by the controller processor 120 and other components of the apparatus 105.

The host computer 110 may also include a number of components, including one or more central processing units (CPUs) 135, input/output circuitry 140, and system memory 145. The host computer 110 may use the apparatus 105 as a lowest level of persistent storage, or the apparatus 105 may be acting as an intermediate level of cache for another layer of non-volatile storage (e.g., hard disk drive). The host computer 110 and apparatus 105 may be commonly coupled to a power supply (not shown), or may include separate power supplies/sources. Host computer 110 also includes non-volatile storage 150, and volatile cache 155 which may be used, for example, to store data as needed by the host computer 110.

Figure 2:
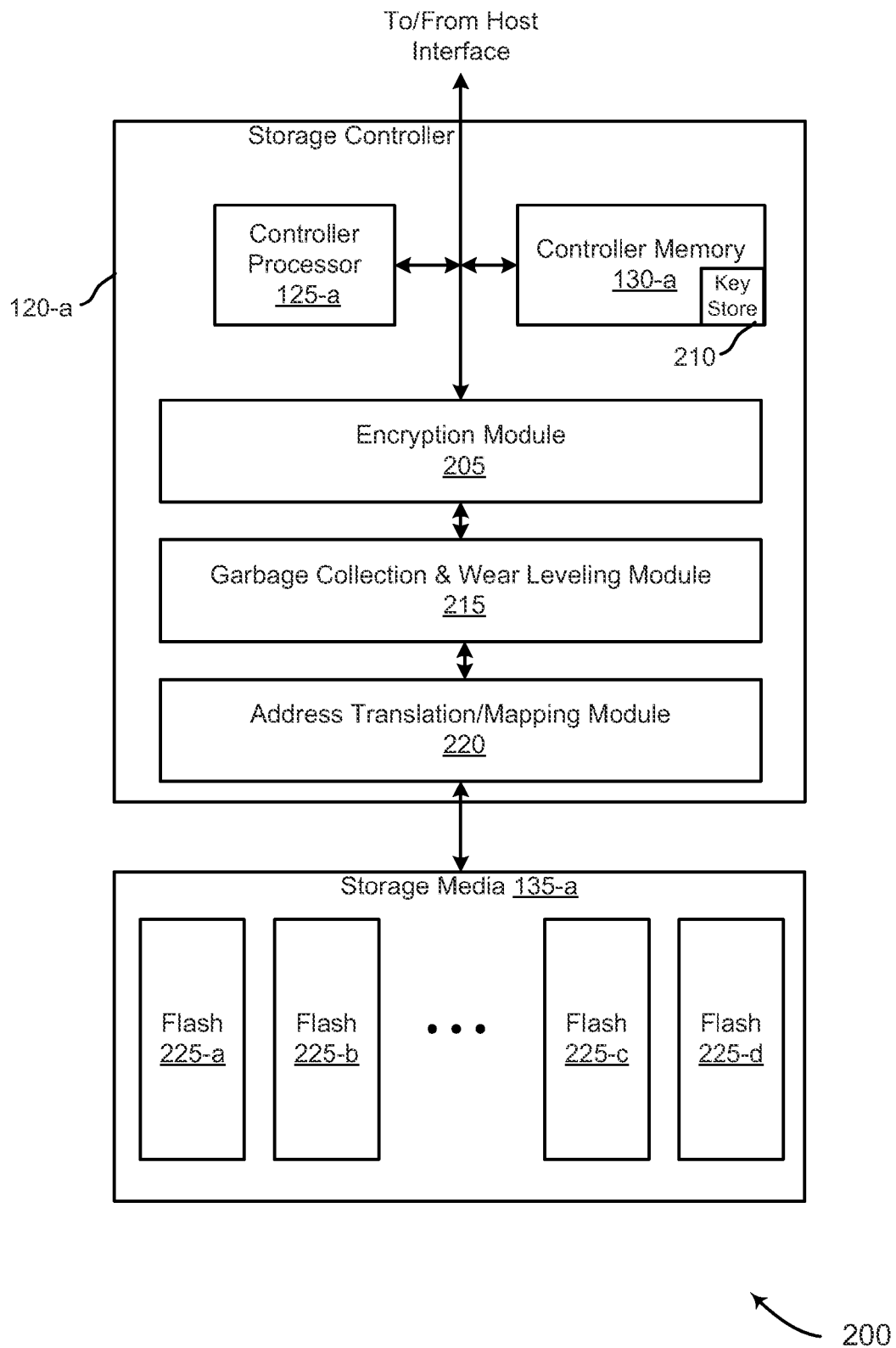
FIG. 2 is a block diagram representation of an example of a storage controller and storage media in accordance with various embodiments.

With reference now to FIG. 2, an example 200 of a storage controller 120-a and storage media 130-a is discussed. The storage controller 120-a and storage media 130-a may be examples of the storage controller 120 and storage media 130 of FIG. 1, for example. In this example, the storage controller 120-a may include controller processor 125-a, controller memory 130-a, an encryption module 205, a garbage collection and wear leveling module 215, and an address translation/mapping module 220. Each of the noted modules may be a means for performing one or more functions related to operation of the storage device, The storage media 130-a, in some examples, may include non-volatile solid-state storage, such as one or more flash dies 225, which individually contain a portion of the total storage capacity of the apparatus 105. The memory contained within individual flash dies 225 may be further partitioned into blocks which may be referred to as erasure blocks/units. The erasure blocks represent the smallest individually erasable portions of the storage media 130-a. The erasure blocks in turn include a number of pages that represent the smallest portion of data that can be individually pro and/or read. In a NAND configuration, for example, the page sizes may range from 512 bytes to 4 kilobytes (KB) and up, and the erasure block sizes may range from 16 KB to 512 KB and up. It will be appreciated that the present embodiments described herein are not limited to any particular size of the pages and blocks.

The actual storage capacity of the storage media 130-a is generally larger than the advertised capacity, due to what sometimes is referred to as overprovisioning of the storage media 130-a. Overprovisioning may be implemented due to the techniques used to manage data storage in solid state memory, which are often different than magnetic storage media. In a magnetic media such as a HDD, each unit of data (e.g., byte, word, sector) may be arbitrarily overwritten by changing a magnetic polarity of a write head as it passes over the magnetic media of the HDD. In contrast, solid state memory cells are first erased by applying a relatively high voltage to the cells before being written, or "programmed."

Such operations may be performed by the address translation/mapping module 220. For a number of reasons, these erasures are often performed on blocks of data (also referred to as "erase units"). An erase unit may include any number of data blocks that are treated as a single unit. When data of an existing page needs to be changed, it may be inefficient to erase and rewrite an entire block of data in which the page resides, because other data within the block may not have changed. Instead, it may be more efficient for the controller processor 125-a to write the changes to empty pages in a new physical location, remap the logical to physical mapping, and mark the old physical locations as invalid/stale. Such operations may result in two or more copies of data being present in the storage media 130-a. In some examples, controller memory 160-a may also employ similar techniques, which may result in two or more copies of data being present in the controller memory 160-a.

After some time, a threshold number of data storage units within a block may be marked as stale due to changes in data. stored within the block. As a result, storage controller 120-a may move any valid data out of the block to a new location and mark the block as erased so that the block is freshly available for programming. The storage controller, in some cases, may not actually physically erase the block, which may result in further copies of data being present in the storage media 130-a. The process of tracking invalid/stale data units. moving of valid data units from an old block to a new block is sometimes collectively referred to as "garbage collection," and such operations may be performed by garbage collection and wear leveling module 215.

Additionally, wear leveling techniques may be employed by the storage controller 120-a. Such techniques may be performed by garbage collection and wear leveling module 215, and may include tracking the erase and write status of the individual blocks and, in the event of an excessive umber of erase and write cycles, may write one or more blocks to another physical location having fewer erase and write cycles. Such techniques may further result in additional copies of data that are located in the storage media 130.

Figure 3:
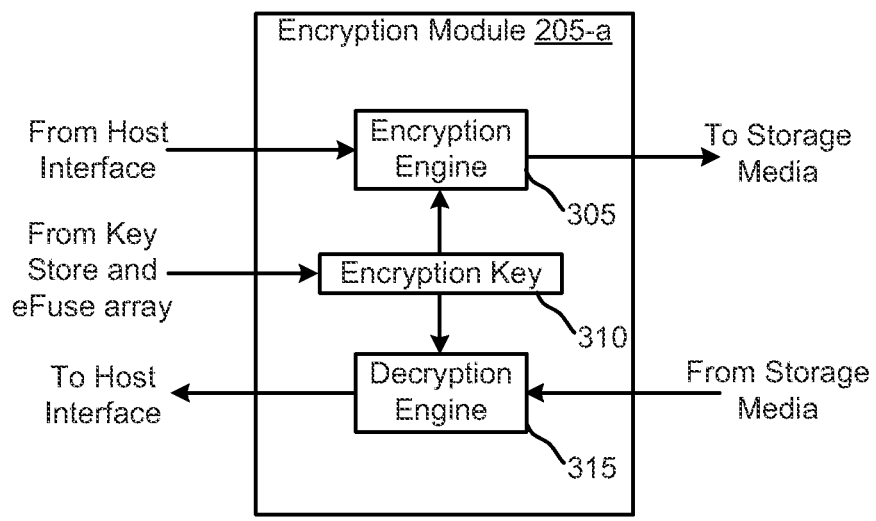
FIG. 3 is a block diagram representation of an encryption module in accordance with various embodiments.

As discussed above, in various embodiments, data may be encrypted by encryption module 205 using one or more encryption keys stored in a key store 210 in controller memory 130-a before being stored in storage media 135-a. Additionally or alternatively, key store 210 may be included in storage media 135-a. With reference now to FIG. 3, a block diagram 300 illustrates an example of an encryption module 205-a according to various embodiments. Encryption module 205-a may be an example of encryption module 205 of FIG. 2, for example. The encryption module 205-a receives data from the host interface at encryption engine 305, and uses an encryption key 310 to perform an encryption algorithm on the data and output encrypted data to be stored in storage media. Likewise, decryption engine 315 may be used to decrypt data from the storage media and provide decrypted data to the host interface. Each of the noted modules/engines may be a means for performing one or more functions related to operation of the storage device.

Encryption key 310, may be formed from a hidden root key and a zeroizable root key, according to various embodiments. In some examples, the hidden root key may be determined by generating a random number, which may be encrypted by a zeroizable root key. The zeroizable root key, in some examples, may be located in an eFuse array, not readable by the storage controller, and unique to each particular die. The hidden root key, as mentioned above, may be partially stored in a re-writable storage location, with one or more bits be stored in a one-time writable storage location such as an eFuse, for example. Such a configuration for the encryption key 310 may be desirable because certain security standards, including the current version of the FIPS 140 standards, require methods to zeroize cryptographic keys that operate from within the boundaries of a cryptographic module. Methods for zeroizing commonly require the cryptographic key to be modifiable or erasable. Methods usually involve cryptographic keys that are either alterable or encrypted with a key that is alterable. In a zeroizable root key stored in a one-time writable memory is zeroized, it may no longer be possible to store encrypted data using the storage apparatus. Accordingly, in some examples, the zeroizable root key may be encrypted with an alterable root key, e.g., hidden root key, in order to generate the encryption key 310. Such a configuration provides a blended key that is a combination of the zeroizable root key and the alterable hidden root key. However, if the hidden root key is stored in an EEPROM or in flash memory in the storage medium, garbage collection and wear leveling routines may generate multiple copies of the hidden root key.

In the event that an attacker gains access to the storage apparatus, such copies may be found and used to decrypt data stored in the apparatus. Furthermore, a storage controller may simply unmap a portion of memory rather than actually erasing the physical memory, such that if a hidden root key were deleted the physical copy of the hidden root key may still remain in the storage medium. In sonic storage devices, such a hidden root key may be stored in a non-wear leveled portion of memory and the storage controller may include controls to ensure that such a specific location in memory is actually erased. However, such steps often require a customized controller which may have relatively higher costs. Thus, in some examples, one or more bits of the hidden root key are stored in a one-time writable storage location, such as an eFuse array.

Figure 4:
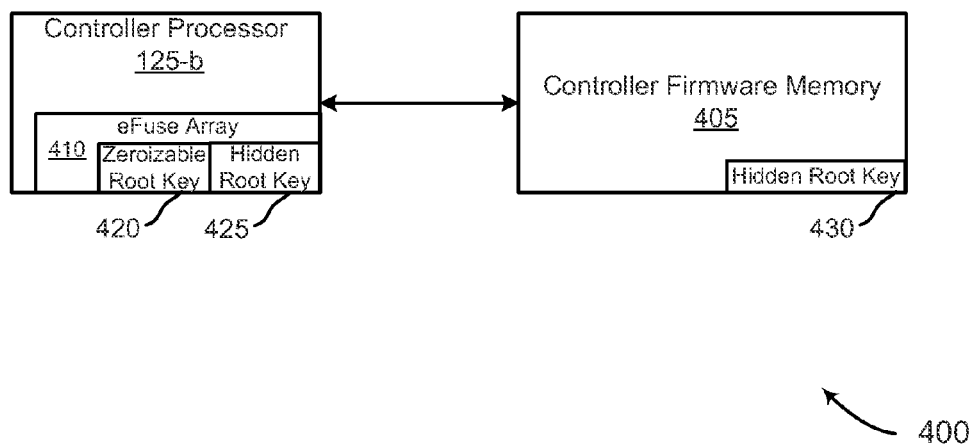
FIG. 4 is a block diagram representation of storage locations of encryption keys in accordance with various embodiments.
Figure 5:
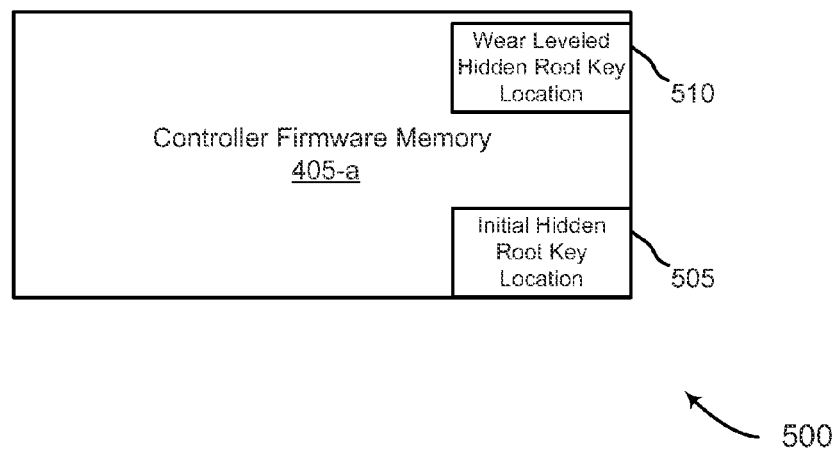
FIG. 5 is a block diagram representation of duplicate storage locations of encryption keys in accordance with various embodiments.

With reference now to FIG. 4, a block diagram 400 illustrates an example of a controller processor 125-b and controller firmware memory 405. In this example, controller processor 125-b includes an eFuse array 410, which may include an array of eFuses. In this example, zeroizable root key 420 is stored in the eFuse array 410, along with a portion of hidden root key 425. Controller firmware memory 405, in this example, also contains a portion of hidden root key 430. As discussed above, in certain situations, the hidden root key 430 stored in controller firmware memory 405 may be subject to garbage collection and/or wear leveling and thus multiple copies of the hidden root key may be present. FIG. 5 illustrates a block diagram 500 of an example of such a situation, in which initial location of hidden root key 505 as well as a wear leveled hidden root key location 510 are both present in controller firmware memory 405-a. In the event that the hidden root key needs to be altered, the portion of the hidden root key 425 stored in the eFuse array 410 may be overwritten, thus altering the hidden root key and rendering any copies 505, 510 of the hidden root key incomplete. In some examples, the eFuse array may have a number of bits that may be used for the portion of the hidden root key 425, and a new set of bits in the eFuse array may then be used for the hidden root key portion 425, in order to create anew hidden root key for further use in the storage apparatus. In other words, destroying, deleting, or changing the hidden root key 425 will essentially terminate access to the base of the blended encryption key 310 (from FIG. 3) by preventing decryption of data that was encrypted using the blended encryption key 310. This would be functionally similar to destroying, deleting or changing zeroizable root key 420, but leaves the zeroizable root key intact for future use.

Figure 6:
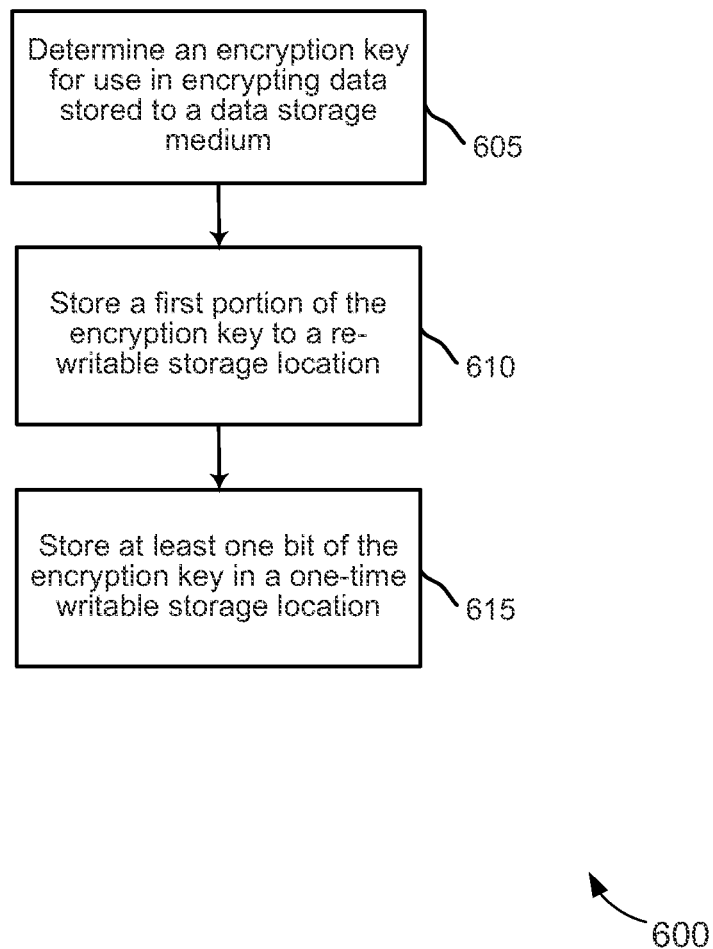
FIG. 6 is a flowchart illustration the operational steps of a method for encryption key storage and modification in accordance with various embodiments.

FIG. 6 is a flowchart of a method 600 for encryption of data stored at a data storage apparatus according to various embodiments. For clarity, the method 600 is described below with reference to aspects of one or more of the data storage apparatus 105, storage controller 120, controller processor 125, and/or encryption module 205 described with reference to FIGS. 1, 2, 3, and/or 5. In one implementation, a storage controller 120, or a processor module thereof, may execute one or more sets of codes to control the functional elements of the device to perform the functions described below.

At block 605, the device may determine an encryption key for use in encrypting data stored to a data storage medium. Such an encryption key may be determined, for example, by generating a random number. In some examples, logic within the storage controller may generate a random number by sampling a group of ring oscillators and providing the sample to conditioning hardware (specified by NIST 800-90) to further randomize the output of the ring oscillators. The output of the conditioning hardware is a data key. This data key may then be encrypted by a zeroizable root key for storage on the storage medium, and used as the encryption key. At block 610, the device may store a first portion of the encryption key to a re-writable storage location. For example, the first portion may be stored in a controller memory or in a memory location in a storage medium of the storage apparatus. At block 615, the device may store at least one bit of the encryption key in a one-time writable storage location. For example, as discussed above, the one-time writable storage location may be one or more bits of an eFuse array.

Figure 7:
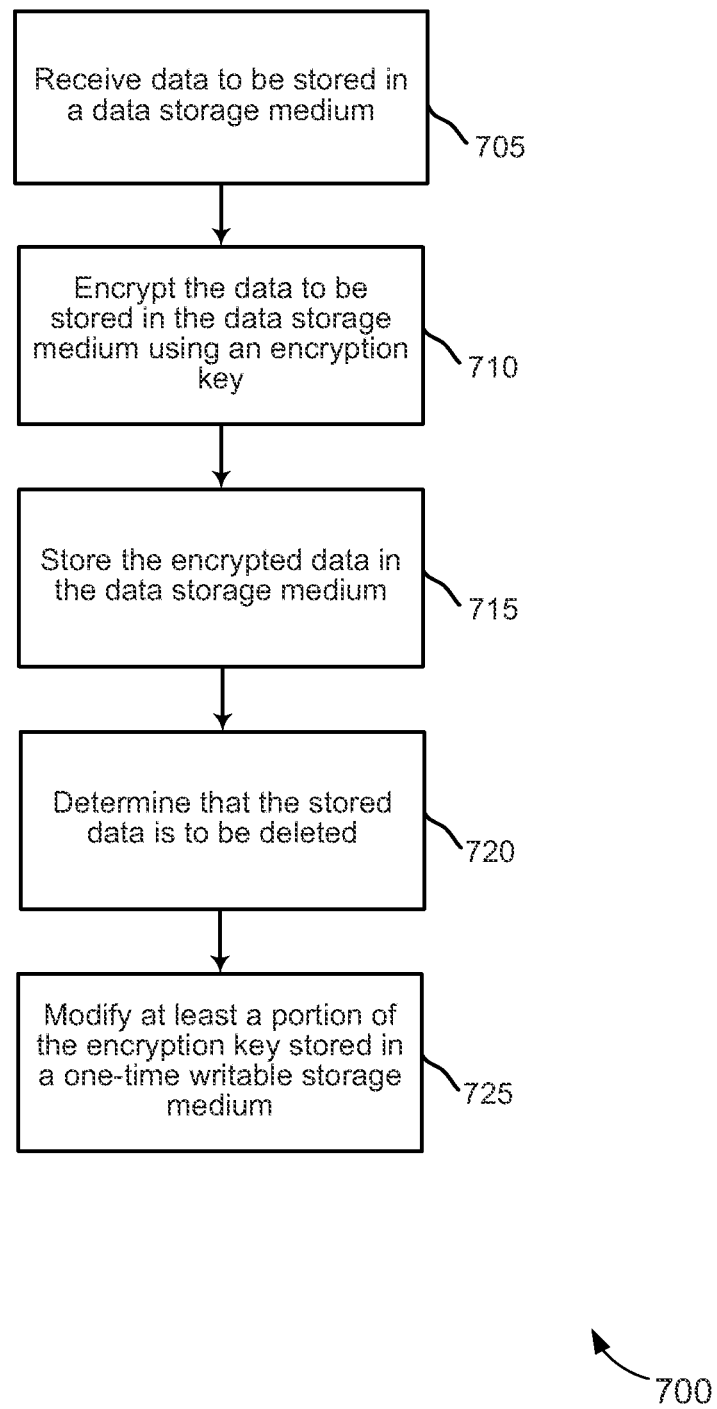
FIG. 7 is a flowchart illustration the operational steps of a method for data storage in accordance with various embodiments.

FIG. 7 is a flowchart of a method 700 for encryption and storage of data at a. data storage apparatus according to various embodiments. For clarity, the method 700 is described below with reference to aspects of one or more of the data storage apparatus 105, storage controller 120, controller processor 125, and/or encryption module 205 described with reference to FIGS. 1, 2, 3, and/or 5. In one implementation, a storage controller 120, or a processor module thereof, may execute one or more sets of codes to control the functional elements of the device to perform the functions described below.

At block 705, the device receives data to be stored in a data storage medium. Such data may be received, for example, from a host computer. At block 710, the device may encrypt the data to be stored in the data storage medium using an encryption key. Such encryption may be performed similarly as discussed above, for example. At block 715, the encrypted data is stored in the data storage medium. At block 720, it is determined that the stored data is to be deleted. Such a determination may be made, for example, based on input from a user that the data is to be deleted. At block 725, at least a portion of the encryption key stored in a one-time writable storage medium is modified. In such a manner, the data stored at the storage medium may not be decrypted, and is therefore effectively deleted. In the event that the storage device is to be used again, a new encryption key may be generated and used for storage of new data.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus the disclosure is not to be limited to the examples and designs described herein but is to be accorded the widest scope consistent with the principles and novel features disclosed herein.

What is claimed is:

1. A method, comprising:
   determining an encryption key for use in encrypting data stored to a data storage medium, the encryption key including a hidden root key combined with a zeroizable key;
   storing a first portion of the hidden root key to a rewritable storage location;
   storing at least one bit of the hidden root key in a one-time writable storage location, the one-time writable storage location including one or more electronic fuses;
   storing the zeroizable key in the one or more electronic fuses;
   blowing at least one of the one or more electronic fuses to render the encryption key unusable;
   encrypting the data using the encryption key;
   storing the encrypted data in the data storage medium;
   determining that the stored data is to be deleted; and
   modifying the at least one bit of the encryption key stored in the one-time writable storage location.

2. The method of claim 1, wherein the modifying prevents decryption of data that is encrypted using the encryption key.

3. The method of claim 1, wherein the first portion of the encryption key is stored in an electronically erasable programmable read only memory (EEPROM).

4. The method of claim 3, wherein the first portion of the encryption is stored in two or more locations in the EEPROM due to wear leveling functions performed on the EEPROM.

5. A data storage device, comprising:
   a first storage medium;
   a one-time writable storage medium; and
   a processor configured to:
      determine an encryption key for use in encrypting data stored to the first storage medium, the encryption key including a hidden root key combined with a zeroizable key;
      store a first portion of the hidden root key to a rewritable storage location on the first storage medium;
      store at least one bit of the hidden root key in the one-time writable storage medium, the one-time writable storage location including one or more electronic fuses;
      store the zeroizable key in the one or more electronic fuses;
      blow at least one of the one or more electronic fuses to render the encryption key unusable;
      encrypt the data using the encryption key;
      store the encrypted data in the first storage medium;
      determine that the stored data is to be deleted; and
      modify the at least one bit of the encryption key stored in the one-time writable storage location.

6. The data storage device of claim 5, wherein the first storage medium comprises an electronically erasable programmable read only memory (EEPROM).

7. The data storage device of claim 6, wherein the first portion of the encryption is stored in two or more locations in the EEPROM due to wear leveling functions performed on the EEPROM.

8. A data storage device, comprising:
   a first storage medium comprising a first portion of a hidden root key of an encryption key, the encryption key including the hidden root key combined with a zeroizable key;
   a one-time writable storage medium comprising at least one bit of the hidden root key, the one-time writable storage location including one or more electronic fuses, the zeroizable key being stored in the one or more electronic fuses; and
   a processor configured to:
      encrypt data using the encryption key;
      store the encrypted data to the first storage medium;
      prevent decryption of the stored encrypted data by blowing at least one of the one or more electronic fuses to render the encryption key unusable;
      determine that the stored encrypted data is to be deleted; and
      modify the at least one bit of the encryption key stored in the one-time writable storage location.

9. The data storage device of claim 8, wherein the first storage medium comprises an electronically erasable programmable read only memory (EEPROM).

10. The data storage device of claim 9, wherein the first portion of the encryption is stored in two or more locations in the EEPROM due to wear leveling functions performed on the EEPROM.

11. The data storage device of claim 9, wherein the encryption key comprises a 512 bit encryption key, and wherein the first portion of the encryption key comprises not more than 256 bits of the encryption key.

* * * * *